United States Patent [19]

Hopping

[11] 4,010,607

[45] * Mar. 8, 1977

[54] INTERNAL COMBUSTION ENGINE WITH AFTERBURNER, VENTURI COOLER AND EXHAUST TURBINE

[76] Inventor: Alvin S. Hopping, Nolan's Point, Lake Hopatcong, N.J. 07849

[*] Notice: The portion of the term of this patent subsequent to Jan. 8, 1992, has been disclaimed.

[22] Filed: Jan. 2, 1973

[21] Appl. No.: 320,435

[52] U.S. Cl. .................................. 60/274; 60/280; 60/303; 60/307; 60/606; 60/614; 60/624

[51] Int. Cl.² ...................... F02B 37/04; F01N 3/12

[58] Field of Search .......... 60/13 N, 307, 317, 308, 60/303, 280, 318, 310, 606, 614, 624, 274

[56] References Cited

UNITED STATES PATENTS

| | | | |
|---|---|---|---|
| 1,828,784 | 10/1931 | Perrin | 60/39.59 |
| 2,409,496 | 10/1946 | Kelley | 60/310 |
| 2,620,621 | 12/1952 | Nettel | 60/13 N |
| 3,248,872 | 5/1966 | Morrell | 60/274 |
| 3,666,422 | 5/1972 | Rossel | 60/303 |
| 3,672,172 | 3/1971 | Hammond | 60/307 |
| 3,739,572 | 6/1973 | Duerr | 123/119 CA |

FOREIGN PATENTS OR APPLICATIONS

| | | | |
|---|---|---|---|
| 443,769 | 10/1935 | United Kingdom | 60/308 |
| 1,004,785 | 9/1965 | United Kingdom | 60/303 |

*Primary Examiner*—Douglas Hart

[57] ABSTRACT

A power plant in which a turbine is driven by the combustion products of hydrocarbon fuel, air under superatomspheric pressure, and the exhaust gases of an internal combustion engine. Air is supplied by a compressor which is driven by the turbine.

6 Claims, 7 Drawing Figures

INTERNAL COMBUSTION ENGINE WITH AFTERBURNER, VENTURI COOLER AND EXHAUST TURBINE

This invention relates to power plants. More particularly it relates to power plants which consume hydrocarbon fuels.

In accordance with the present invention, a power plant comprises a hydrocarbon-fueled internal combustion engine having a primary combustion chamber, said engine discharging hot exhaust gases during operation thereof, means defining a secondary combustion chamber of fixed volume, means for delivering to said combustion chamber hydrocarbon fuel and air under superatmospheric pressure, means for directing said hot exhaust gases into said combustion chamber, means defining an injection chamber in which hot gaseous products discharged from said combustion chamber are commingled with further air under superatmospheric pressure and at a temperature below that of said hot gaseous products to form a final gaseous mixture of reduced temperature, a turbine, means for directing said final gaseous mixture into said turbine thereby causing rotation thereof, and means for withdrawing mechanical power from said internal combustion engine and from said turbine. The invention also includes within its scope the process of operation thereof as described and claimed herein.

The instant invention also includes within its scope the process of power generation which is carried out in the instant apparatus.

The invention will be more specificaly illustrated in conjunction with the preferred specific embodiment set forth in the accompanying figures, in which.

Figure 1:
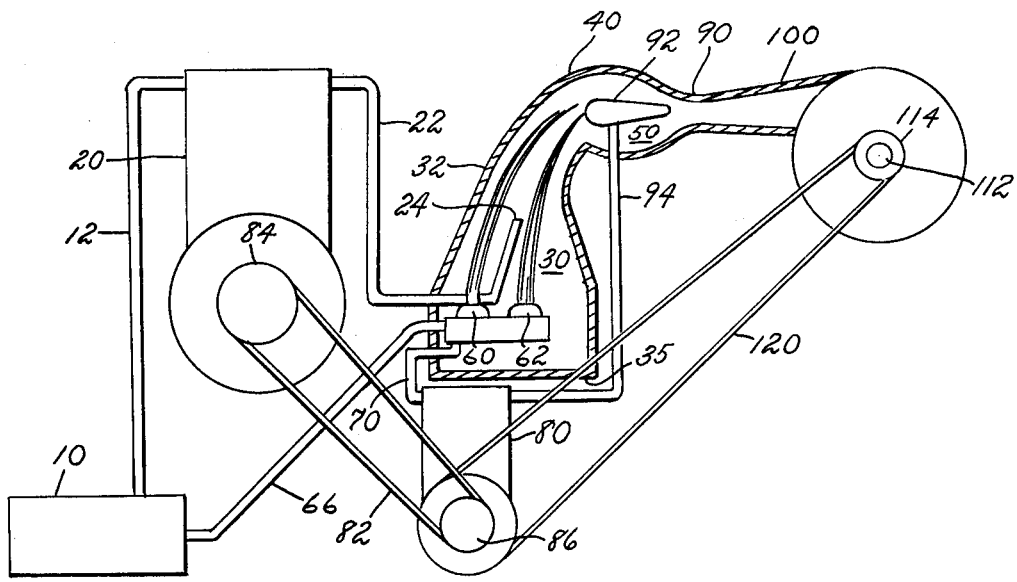
FIG. 1 is a view, principally schematic in nature, of a power plant constructed in accordance with the present invention.
Figure 2:
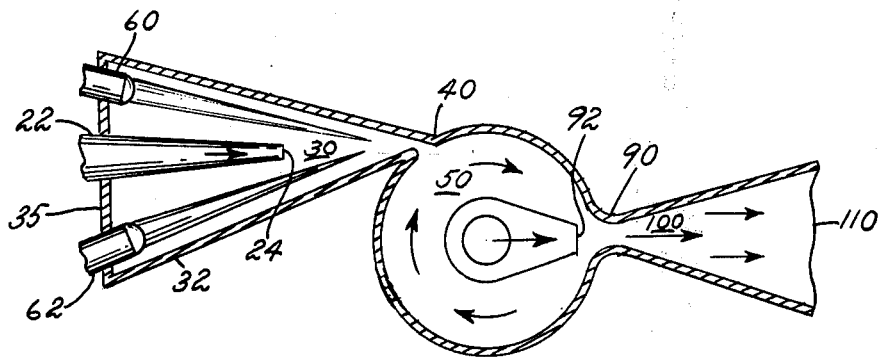
FIG. 2 is a detailed view in plan of that portion of the device of FIG. 1 in which hot gases are commingled with each other and with air under superatmospheric pressure.
Figure 3:
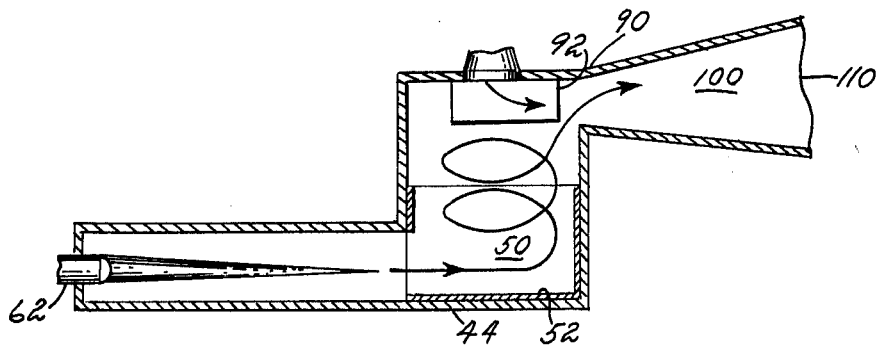
FIG. 3 is a view in elevation of the structure of FIG. 2.

In the embodiment of FIGS. 1–3, a fuel tank 10 for hydrocarbon fuel such as gasoline is connected by a fuel line 12 to the intake of a conventional two cylinder, (Otto) four cycle gasoline engine 20 having a 15 horsepower nominal rating and a compression ratio of approximately 8.5:1. The exhaust gases discharged by the engine 20 are delivered by a conduit 22 (through the open end 24 of the conduit 22) into a closed combustion chamber 30 of fixed volume defined by a conical shroud 32 which is closed to the atmosphere at its mouth by a wall 35. The shroud 32 tapers inwardly from its mouth end to a throat 40, causing compression of the hot gases passing therethrough.

As indicated in FIGS. 2 and 3, the throat 40 discharges tangentially into the outer periphery of the base 44 of a cylindrical mixing chamber 50, which imparts a cyclonic motion to the hot gases passing through the chamber. The mixing chamber 50 is lined with a replaceable catalyst 52 to aid in effecting completion of oxidation and reduction of undesired emissions of products of combustion.

A pair of compressed air burners 60 and 62 are supplied with gasoline from the fuel tank 10 by a fuel line 66 and with compressed air through an air line 70 from an air compressor 80. (The fuel consumption of these burners, on a BTU basis, is from 20 to 35 percent of the fuel consumption of the internal combustion engine.) The air compressor 80 is driven during start-up by the gasoline engine 20 by means of a belt 82 and pulley 84, 86 arrangement, this linkage being disengaged after the start-up operation is completed and the unit is in operation.

In the combustion chamber 30, the hot exhaust gases delivered to the chamber by the conduit 22 commingle with the hot gaseous products of combustion of the compressed air-gasoline burners 60 and 62. Inasmuch as the burners are operated with excess air, any incompletely oxidized components contained in the exhaust gases of the internal combustion engine 20 are completely oxidized in the combustion chamber 30 and the subsequently catalyst-lined mixing chamber 50. The use of a plurality of burners is advantageous in that it provides more flame surface for reaction with the exhaust gases (as compared to only one flame).

The gaseous mixture passing through the mixing chamber is discharged at the top thereof through a venturi 90 which constitutes an injection mixer.

Depending from the top of the cylindrical mixing chamber 50 is a nozzle 92 which delivers compressed air into the stream of gases entering the venturi 90. The nozzle 92 is supplied with compressed air by an air line 94 from the air compressor 80.

The compressed air supplied to the venturi 90 by the nozzle 92 is considerably cooler than the hot gases passing through the mixing chamber 50 and about the nozzle, and has a cooling effect on those gases.

The final mixture leaving the venturi 90 enters an expansion chamber 100 in which expansion and further cooling occur, and the cooled, expanded mixture of gases is discharged therefrom to the full diameter of a multistage turbine 110 which is driven thereby. The turbine 110 has a 5.0 horsepower nominal rating.

The turbine 110 is mechanically coupled, through its rotating shaft 112 and pulley 114, through a belt 120 to the air compressor 80 and drives the compressor under normal operating conditions (i.e., after the drive from the internal combustion engine 20 is disengaged as described above).

Figure 4:
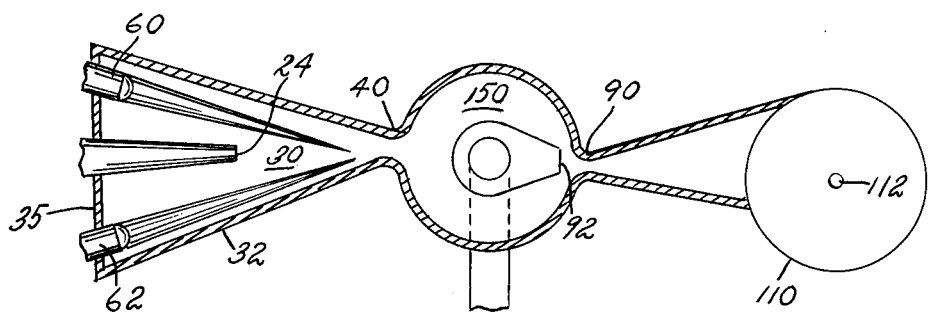
FIGS. 4–7 are views of structures alternate to that of FIG. 2.

The embodiment of FIG. 4 is similar to the preceding with the exception that the mixing chamber 150 which is disposed between the throat 40 of the combustion chamber 30 and the venturi 90 is a symmetrical, lateral enlargement about the nozzle 92 of the conduit walls which define the chamber.

Figure 5:
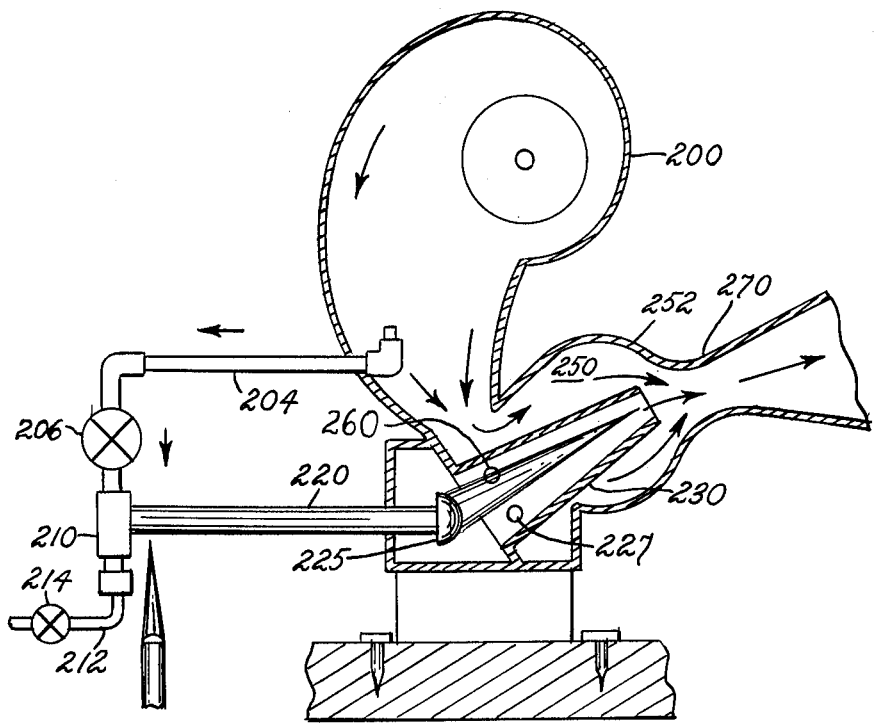

In the embodiment of FIG. 5, air from a compressor 200 is directed through a conduit 204 and control valve 206 to a mixing tee 210 wherein it is commingled with fuel supplied through a line 212 and fuel valve 214. A mixture of fuel and air is discharged by the tee 210 into a line 220 in which it is preheated. The preheated mixture is burned at a nozzle 225 inside the walls of a tapered retaining cone 230. Exhaust gases from the internal combustion engine are injected tangentially into the cone 230 (near the base of the flame formed by the nozzle 225) by gas injection tube 227 to impart spin, and thereby a longer transit path, to the gases inside the cone. The cone 230 is disposed within a larger chamber 250 (defined by walls 252) into which air is introduced from the compressor 200. Thus, the hot flame from the nozzle 225 is immediately surrounded by the spinning exhaust gases from the tube 227 within the cone 230, which in turn is surrounded by relatively cool air in the chamber 250.

An additional nozzle 260 is also laterally offset from the center of the cone 230 to facilitate the injection tangentially, near the base of the cone, of a dilute alkaline aqueous coolant which serves to reduce substantially the size of the power plant. As a result of the use of the aqueous coolant, only enough air need be supplied by the air compressor to cover oxidation demands, so the size of the compressor can be reduced as compared to the size necessary when air is used as a primary coolant. When the aqueous coolant is employed, the turbine is driven by a mixture of steam and gases, and the alkali in the coolant neutralizes any acids formed by the combustion processes and protects the exposed metal surfaces against corrosion.

The gases from all three sources are commingled in a venturi throat 270 and thence directed into a turbine as indicated previously.

Figures 6, 7:
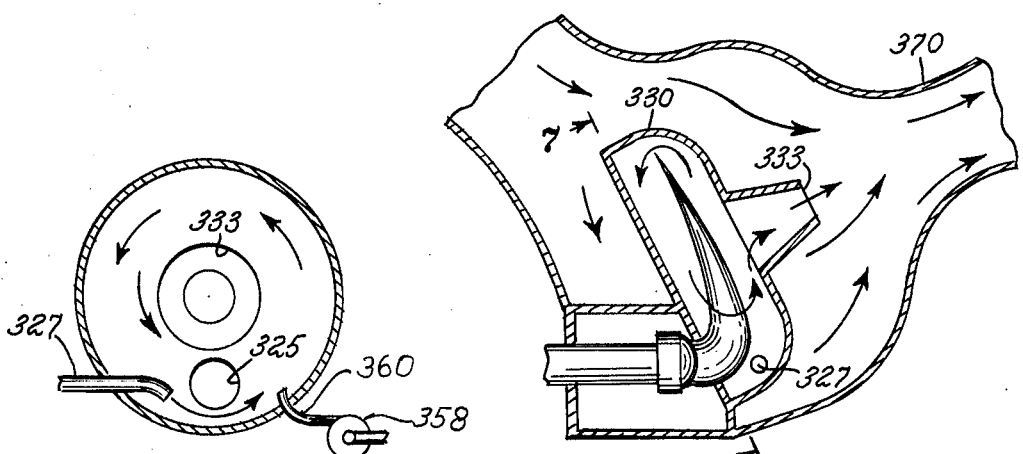

The structure of FIGS. 6 and 7 is comparable to that of FIG. 5, FIG. 7 being a view in the plan 7—7 of FIG. 6. As is clear from the figures, in this embodiment a retaining cone 330 is provided with a peripherally disposed injection tube 327 for exhaust gases and with a nozzle 325 disposed between the center of the cone 330 and the mouth of the injection tube 327, being in close proximity but slightly downstream therefrom. The mixture of gases formed within the cone is emitted axially from an orifice 333 in the cone 330 into a throat 370, and thence to a turbine as before. Aqueous coolant is injected by a pump 358 through a tangentially disposed nozzle 360.

In operation, the internal combustion engine 20 is started in the conventional manner and is engaged with and drives the air compressor 80. Thereupon, the flame in the secondary combustion chamber is ignited and the turbine 110 is placed into operation, driving the air compressor 80, following which the drive between the internal combustion engine and the air compressor is disengaged.

The instant apparatus and process virtually completely eliminate emission of unburned hydrocarbons and carbon monoxide, and produce very low levels of $NO_x$ emissions. The instant apparatus is characterized by instant start-up, and high efficiency, which in turn reduces fuel consumption. As a result of the very high ratios of air to fuel which may be employed, and the use of the instant turbine, low cost hydrocarbon fuels may be used. (Note that the same fuel does not have to be employed in both the internal combustion engine and in the compressed air burners.) The cooling action of the air injected circumferentially about the mixture of exhaust gases and central flame and/or at the venturi, and also of the subsequent expansion stage, minimizes overheating of the apparatus and also lowers the temperature of the gases entering the turbine to the point that the turbine blades may be constructed of relatively inexpensive materials inasmuch as they do not have to tolerate particularly high temperatures. Finally, the instant power plant offers the advantage of not requiring the use of a muffler, which aids in increasing operating efficiency.

It should also be apparent that the instant apparatus, by virtue of its relative high operating efficiency, occupies less space than internal combustion engines of comparable output.

What is claimed is:

1. A process which comprises burning hydrocarbon fuel in an internal combustion chamber to generate exhaust gases, burning additional fuel with excess compressed air in a secondary combustion chamber, commingling said exhaust gases in said secondary combustion chamber with said burning additional fuel and air under superatmospheric pressure, imparting spiral rotating circulation to the commingled gases in said secondary combustion chamber by directing said exhaust gases through a means tangentially disposed in said secondary combustion chamber and passing said commingled gases through a zone of reduced cross-sectional area, introducing cool air under superatmospheric pressure into said commingled gases in said zone, thereafter passing said mixture of gases and air through a zone of enlarged cross-sectional area further to cool the mixture, directing said cooled mixture into a turbine, discharging substantially completely oxidized gaseous effluent from said turbine, and coupling said turbine to an air compressor from which said air under superatmospheric pressure is derived.

2. A power plant comprising a hydrocarbon-fueled internal combustion engine having a primary combustion chamber, said engine discharging hot exhaust gases during operation thereof, means defining a secondary combustion chamber of fixed volume having a tapering conical shape, means for delivering to said secondary combustion chamber hydrocarbon fuel and air under superatmospheric pressure centrally axially disposed with respect thereto, means for directing hot exhaust gases tangentially disposed in said secondary combustion chamber so as to impart a circular cyclonic rotation to said exhaust gases in said chamber thereby increasing their transit path therethrough, means defining an injection chamber in which hot gaseous products discharged from said secondary combustion chamber are commingled with further air under superatmospheric pressure and at a temperature below that of said hot gaseous products to form a final gaseous mixture of reduced temperature, a turbine, means for directing said final gaseous mixture into said turbine thereby causing rotation thereof, and means for withdrawing mechanical power from said internal combustion engine and from said turbine.

3. A power plant as set forth in claim 2 which includes an air compressor, driven by said internal combustion engine and by said turbine, for supplying said air to said secondary combustion chamber under superatmospheric pressure.

4. A power plant as set forth in claim 3 in which said injection chamber is a venturi and which includes an injection nozzle disposed at the discharge end of said secondary combustion chamber and in proximity to the throat of said venturi for injecting gases at superatmospheric pressure into admixture with air at superatmospheric pressure from said compressor.

5. A power plant as set forth in claim 3 which includes a cooling and expansion chamber disposed between said injection chamber and said turbine.

6. A power plant as set forth in claim 3, including means for injecting alkaline aqueous coolant disposed near the outer periphery of the secondary combustion chamber.

* * * * *